United States Patent [19]
Kern et al.

[11] 3,723,575
[45] Mar. 27, 1973

[54] METHOD OF PRODUCING GRAFT POLYMERS

[75] Inventors: William John Kern, Barberton; Thomas Chester Bouton, Akron; Harold Elwood Adams, Cuyahoga Falls, all of Ohio

[73] Assignee: The Firestone Tire & Rubber Company, Akron, Ohio

[22] Filed: Apr. 14, 1971

[21] Appl. No.: 134,058

[52] U.S. Cl.............260/879, 260/94.2 M, 260/880
[51] Int. Cl.......C08f 19/08, C08f 15/04, C08f 15/02
[58] Field of Search.................260/94.2 M, 879, 880

[56] References Cited
UNITED STATES PATENTS 3,492,369  1/1970  Naylor.................260/879

Primary Examiner—Joseph L. Schofer
Assistant Examiner—William F. Hamrock
Attorney—S. M. Clark and Gordon B. Seward

[57] ABSTRACT

Graft polymers are produced by polymerizing a first monomer charge at a relatively low temperature, heat-treating the polymer, and charging additional monomer. The first monomer charge contains at least one conjugated diene of from four to eight carbons, and the first polymerization step is performed in the presence of a hydrocarbon lithium initiator. The heat-treating step is performed on the base polymer at 70°–130° C. for 2 – 200 hours.

11 Claims, No Drawings

METHOD OF PRODUCING GRAFT POLYMERS

BACKGROUND OF THE INVENTION

This invention relates to a method for producing polymers from conjugated diene monomers using a hydrocarbon lithium initiator. More specifically, the invention relates to a method for producing graft polymers from conjugated diene monomers (optionally with vinyl aromatic comonomers) using a hydrocarbon lithium initiator, by forming a base polymer at a relatively low polymerization temperature, heating the base polymer at an elevated temperature for a period of time, and then charging additional polymerizable monomer and completing the polymerization.

In early work on polymerizing conjugated dienes, with or without vinyl aromatic comonomers, highly linear polymers resulted which had relatively narrow molecular weight distribution. Because of these characteristics, the polymers were sometimes difficult to process, and exhibited troublesome cold flow. A number of investigators have presented methods for improving such polymers by causing branched polymer structures to be formed, or by broadening the molecular weight distribution of the polymers.

Graft polymerization techniques for producing polymers from conjugated dienes are also well-known. By placing additional polymer grafts on base polymers a variety of different polymeric materials can be produced, depending on the types and amounts of monomers used, and the order in which they are added.

The instant invention offers a novel and convenient method for producing a variety of graft polymers from conjugated dienes, optionally with vinyl aromatic comonomers, using a hydrocarbon lithium initiator.

SUMMARY OF THE INVENTION

Briefly stated, the invention presents a process for producing graft polymers by first forming a base polymer from a monomer change comprising at least one conjugated diene, in the presence of a lithium based initiator, then heat-treating the base polymer for 2 to 200 hours at 70° to 130° C., and adding a second charge of polymerizable monomer and completing polymerization.

The base polymer is formed at a relatively low temperature, and is characterized by a relatively narrow molecular weight distribution and a high degree of linearity. After heat treatment and the engrafting of additional monomer the completed polymer has increased branching and a broader molecular weight distribution.

The polymerizable monomer added in the second charge can be a conjugated diene, a vinyl aromatic compound, or any of a number of monomeric materials polymerizable in a lithium catalyst system. The use of an inert diluent during the process is preferred.

SPECIFIC EMBODIMENTS OF THE INVENTION

The hydrocarbon lithium initiators used in the method of the invention are compounds of the general formula $RLi_x$, where R is an alkyl, aryl, alkaryl, aralkyl or cycloalkyl hydrocarbon radical of from one to 20 carbon atoms, and $x$ is an integer of from 1 to 4. Examples of these compounds include methyllithium, ethyllithium propyllithium, n-butyllithium, 2-ethylhexyllithium, phenyllithium, methylenedilithium, 1,4-dilithiobenzene, 1,5-dilithionaphthalene, and the like.

Conjugated diene monomers used in the method of the invention are those containing from four to eight carbon atoms, such as butadiene-1,3, isoprene, piperylene, 2,3-dimethyl-1,3-butadiene, 2-methylpentadiene, 3,4-dimethyl-1,3-hexadiene, and the like. Preferred are butadiene-1,3 and isoprene. One or more different conjugated diene monomers can be used.

Vinyl aromatic monomers which can be employed include styrene and its various hydrocarbyl substituted homologues up to a total of 20 carbon atoms. The substituents must be on the ring rather than the vinyl side-chain, and compounds such as alpha-methyl styrene are specifically excluded. Usable compounds include 1-vinylnaphthalene, 2-vinylnapthalene, 3-methylstyrene, 4-n-propylstyrene, 4-cyclohexylstyrene, 1,2-diphenylethylene, phenylstyrene and the like.

For processing convenience an inert diluent is usually employed, and is present with the initiator. The diluent can be any hydrocarbon liquid of from four to 10 carbon atoms which is inert in the system, including alkyl, aryl, or cycloalkyl hydrocarbons. Preferred diluents include pentanes, hexanes, heptanes, benzene, toluene, xylene, cyclopentane, cyclohexane and the like. Mixtures of two or more of the above can also be used. Mass polymerization techniques can also be employed, wherein no diluent is required.

As stated above, the first step of the method of the invention is preparation of the base polymer. A first monomer charge is introduced into a polymerization zone into contact with the initiator. At least one conjugated diene monomer is included in the first charge, but two or more may be used. One or more vinyl aromatic monomers can also be included in the first monomer charge.

Normal precautions should be taken to exclude from the reaction zone materials which would consume initiator, such as water, oxygen or carbon dioxide.

The base polymer is formed at a relatively low temperature — from 0° to 65° C., and preferably from about 30° to 50° C. The low temperature conditions tend to produce a polymer having a narrow molecular weight distribution. Additionally, low temperatures minimize the reactions which tend to kill polymer "live ends". It is preferred to react the base polymer essentially to completion, although a small amount (less than about ten per cent) of the monomer can remain unreacted. Unreacted monomer, if any, can be removed, or allowed to polymerize in a pre-heating period as described below.

After the formation of the base polymer, it is subjected to a heating step. Either in the original reactor or in a second vessel, the temperature of the base polymer is raised to a predetermined level between 70° and 130° C. If unreacted monomer is present during the initial pre-heating stage of the heating step, the effective heating time does not begin until the unreacted monomer has been essentially completely polymerized. The presence of an inert diluent at this point will greatly increase heat transfer, and facilitate the heating step. The base polymer is heated for a period of from 2 to 200 hours in the essential absence of free monomer.

A number of possible reactions have been proposed to interpret the changes which occur during the heating step. Before heating, the lithium atoms are predominately located at one or both ends of the polymer chains. Elimination occurs when a lithium atom (or atoms) forms lithium hydride, producing in each instance a "dead" polymer chain. Metalation can also occur, wherein a lithium atom leaves its terminal position and attaches itself to a polymer chain at an intermediate point along the polymer backbone. Addition can occur if a polymer chain, from which the terminal lithium has been eliminated, adds to a "live" chain. In any case, the extent of heating must be insufficient to terminate all the live chains.

In the third step of the method additional monomer is added to the heat-treated base polymer. This additional monomer is preferably one or more of the conjugated diene or vinyl aromatic monomers set forth above. However, any of a number of other monomeric materials capable of polymerization in a lithium-initiated system can also be used, either singly, or in combination. For example, conjugated dienes of from four to eight carbon atoms which contain halogen or alkoxy substituents can be used. These materials include 1-chlorobutadiene-1,3, 2-chlorobutadiene-1,3 (chloroprene), fluoroprene, 2-methoxy-1,3-butadiene, 2-ethoxy-3-ethyl-1,3-butadiene, and the like.

Halogen-substituted vinyl aromatic monomers having up to 20 carbons which are also useful include 2-chlorostyrene. Other variously substituted vinyl aromatic monomers having up to 20 carbons which can be used are those which are alkoxy-substituted or amino-substituted, such as the methoxy styrenes, and dimethyl aminostyrene, for example.

Acrylic and alkacrylic acid esters and nitriles which can be used include methyl acrylate, ethyl acrylate, butyl acrylate, methyl methacrylate, ethyl methacrylate, acrylonitrile, methacrylonitrile and the like. Other polymerizable monomers include such compounds as 2-vinylpyridine, divinyl benzene and vinylfuran. Based on the weight of the first monomer charge, the amount of the second monomer charge can be from 10 to 900 percent by weight. Polymerization is then allowed to continue at from −40° to 130° C, depending on the monomer used.

The amount of initiator used in the initial step can be varied to produce the desired molecular weight in the base polymer. From 0.001 to 0.10 grams of carbon-bound lithium per 100 grams of initially charged monomer can be used, with the lower amounts producing a relatively high molecular weight, and higher amounts giving a low molecular weight in the base polymer.

In general, a single monomer is usually charged initially to produce a base polymer which is a diene homopolymer. A range of from 0.003 to 0.08 grams of carbon-bound lithium per 100 grams of initially charged monomer has been found to be preferred, producing base polymers most suitable for the method. The preferred range of base polymer molecular weight is from 10,000 to 200,000. If more than one monomer is initially charged, differing reaction rates can produce block copolymers in the base polymer, unless randomizing techniques are employed, as known in the art.

The method of the invention can be performed either as a batch or continuous process. If a batch process is used, the base polymer is formed, then the reactor temperature is raised to the desired level, and kept at that level for the desired time. The second charge of monomers is then added, and allowed to polymerize. The second charge of monomers can be polymerized to completion, or terminated short of completion, if desired, with recovery of unreacted monomers. Termination can be effected and the final product recovered as is ordinarily done with lithium-catalyzed polymers.

A continuous process can also be used, embodying the method of the invention. The base polymer can be produced in a first vessel and transferred to a second vessel for heat treatment. A heat exchanger before the second vessel can be used to bring the base polymer to temperature quickly. After heat-treatment, the second monomer charge can be introduced into the second vessel, or the material can then be transferred to a third vessel for the second charge of monomer and final polymerization step. The final product is then recovered in the usual manner.

As shown above, the time and temperature employed in the heat-treatment step can have a significant effect on the properties of the final product. It is therefore desirable to have some measure of the effect on the base polymer of heat treatment. By employing the modified Gilman titration method set forth by Turner et al. in Rubber Chemistry and Technology, 42, 1054 (1969), an indication of the effect of heat treatment on the polymer was obtained. The titration measures the amount of carbon-bound lithium remaining in the polymer mixture. The lithium atoms which react during heat treatment to form lithium hydride would not show up in the titration and are a measure of the loss of activity. As would be expected, the various reactions of the lithiated polymer during heating are more rapid if higher treating temperatures are used. Accordingly, a shorter heating time would usually be used if high temperatures are employed. The initial depletion of carbon-bound lithium has been observed to be more rapid, with a leveling off occuring after a few hours of treatment. This effect was noted at various treating temperatures throughout the range.

A more complete understanding of the method of the invention can be obtained by reference to the following examples, in which all precentages are by weight unless otherwise noted.

The "dilute solution viscosity" referred to herein is defined as the inherent viscosity determined at 25° C. on a 0.4 percent solution of the polymer in toluene. It is calculated by dividing the natural logarithm of the relative viscosity by the per cent concentration of the solution, i.e., it is the inherent viscosity measured at 0.4 percent concentration.

EXAMPLE I

To investigate the production of graft polymers based on a homopolymer of butadiene-1,3, a series of runs was performed. Using differing levels of a n-butyllithium initiator, base homopolymers were formed from butadiene-1,3, which base polymers had varied molecular weights. After forming the base polymers, they were heat-treated at various temperatures. The pertinent data are shown in the following Table I.

TABLE I

| Run No. | Initiator Level [1] | Theoretical Molecular Weight [2] | D.S.V. [3] | Time, Hrs. | Temp. °C. | Fraction of remaining activity [4] |
|---|---|---|---|---|---|---|
| 1 | 0.0086 | 80,000 | 2.26 | 19 | 80 | 0.22 |
| 2 | 0.0182 | 37,900 | 0.81 | 18 | 80 | 0.64 |
| 3 | 0.0104 | 66,000 | — | 7 | 93 | 0.33 |
| 4 | 0.0165 | 41,700 | — | 5 | 93 | 0.67 |
| 5 | 0.0115 | 60,000 | — | 7 | 93 | 0.35 |

1 Grams of carbon-bound lithium per 100 grams of monomer
2 Based on the initiator level
3 Dilute solution viscosity
4 Fraction, based on original initiator level, of carbon-bound lithium remaining after heat treatment.

EXAMPLE II

The heat-treated polybutadiene base polymers produced in Example I were then subjected to grafting reactions to add different amounts of various monomers. The amounts and conditions are shown in the following Table II, along with analytical test results on the final polymer product.

TABLE II

| Base polymer Run no. | Parts of engrafted monomer, per 100 parts base polymer | | Grafting conditions | | Analytical results | | | |
|---|---|---|---|---|---|---|---|---|
| | Butadiene-1,3 | Styrene | Time, hrs. | Temp. °C. | DSV | ML4 at 100° C. | NMR % styrene Total | Block |
| 1 | 50 | 0 | 5 | 40°–88° | 5.17 | 78 | — | — |
| 2 | 42.5 | 0 | — | — | 6.96 | — | — | — |
| 3 | 45 | 30 | 5½ | — | 4.07 | — | 22.8 | 7.4 |
| 4 | 100 | 33 | 5½ | — | 2.07 | 60 | 20.1 | 0 |
| 5 | 49 | 35 | — | — | 2.81 | 95 | 20.7 | 9 |

EXAMPLE III

Using the techniques employed in Examples I, base polymers are produced charging the following monomers into a reaction zone containing n-butyllithium initiator at various levels between 0.001 and 0.10 grams of carbon-bound lithium per 100 grams of monomer:

A. Isoprene
B. Butadiene and Styrene (70/30)
C. Isoprene and Styrene (70/30)
D. Butadiene and Isoprene (50/50)

The base polymers formed are heat treated for from 2 to 200 hours at temperatures of from 70° to 130° C.

EXAMPLE IV

To the base polymers which are produced according to Example III, and variously heat-treated, the following monomers are charged in amounts varying from 10 to 900 percent, based on the weight of the base polymers:

A. Butadiene
B. Styrene
C. Isoprene
D. Butadiene and Styrene
E. Butadiene and Isoprene
F. Chloroprene
G. Acrylonitrile The graft polymers produced were recovered and showed a variety of useful characteristics.

The graft polymers produced by the method of the invention have a variety of uses, depending on their monomeric composition, molecular weight distribution, degree of branching, etc. In general, the broad molecular weight distribution and relatively high degree of branching obtained gives polymers having low cold-flow and high green strength. These properties are desirable for fabrication operations wherein the polymers must retain dimensional integrity before vulcanization. Tires, hose, belting and similar articles can be made using the graft polymers of the invention.

We claim:

1. The method of producing a graft polymer by the successive steps of
   introducing a first monomer charge comprising at least one conjugated diene of from four to eight carbons into a polymerization zone in contact with an initiator of the formula $RLi_x$, where R is an alkyl, aryl, alkaryl, aralkyl or cycloalkyl hydrocarbon radical of from one to 20 carbons, and $x$ is an integer of from 1 to 4, the initiator being present in an amount of from 0.001 to 0.10 grams of carbon-bound lithium per 100 grams of monomer first charged and the polymerization zone is maintained at a temperature of from 0° to 65° C. until a base polymer is formed,
   heating the base polymer thus formed in the essential absence of free monomer at a predetermined temperature of from 70° C. to 130° C. for from 2 to 200 hours, said heating being insufficient to terminate all live chains,
   adding a second charge of polymerizable monomer and allowing the resultant mixture to polymerize at a temperature of from −40° to 130° C whereby a graft polymer is produced, the amount of the second monomer charge being from 10 to 900 percent by weight based on the first monomer charge.

2. The method of claim 1, wherein the conjugated diene monomer is isoprene or butadiene-1,3, or mixtures of both.

3. The method of claim 1, wherein the first monomer charge includes a vinyl aromatic monomer having up to 20 carbons.

4. The method of claim 3, wherein the vinyl aromatic monomer is styrene.

5. The method of claim 1, wherein an inert hydrocarbon diluent is present in the polymerization zone.

6. The method of claim 1, wherein the polymerization zone is maintained at a temperature of from 30° to 50° C. until a base polymer is formed.

7. The method of claim 1, wherein the initiator is n-butyllithium.

8. The method of claim 1, wherein the second charge of polymerizable monomer comprises a conjugated diene of from four to eight carbons or a vinyl aromatic monomer having up to 20 carbons.

9. The method of claim 1, wherein the second charge of polymerizable monomer comprises one or more halogen- or alkoxy-substituted conjugated dienes of from four to eight carbons.

10. The method of claim 1, wherein the second charge of polymerizable monomer comprises one or more vinyl aromatic monomers having up to 20 carbon atoms which monomers are halogen-, alkoxy- or amino-substituted.

11. The method of claim 1, wherein the second charge of polymerizable monomer comprises one or more acrylic or alkacrylic acid esters or nitriles.

* * * * *